United States Patent [19]

Bauer et al.

[11] Patent Number: 5,660,709
[45] Date of Patent: Aug. 26, 1997

[54] ELECTROCHEMICAL PROCESS AND DEVICE FOR THE PRODUCTION OF METALLIC HYDROXIDES AND/OR METALLIC-OXIDE HYDROXIDES

[75] Inventors: Bernd Bauer, Fechingen; Thomas Menzel, Stuttgart, both of Germany

[73] Assignee: Fraunhofer-Gesellschaft zur Forderung der Angewandten Forschung e.V., Munich, Germany

[21] Appl. No.: 586,855

[22] PCT Filed: May 11, 1995

[86] PCT No.: PCT/DE95/00643

§ 371 Date: Jan. 25, 1996

§ 102(e) Date: Jan. 25, 1996

[87] PCT Pub. No.: WO95/33084

PCT Pub. Date: Dec. 7, 1995

[30] Foreign Application Priority Data

May 26, 1994 [DE] Germany .......................... 44 18 440.9

[51] Int. Cl.⁶ .......................................... C25B 1/00
[52] U.S. Cl. ........................ 205/344; 205/508; 205/509
[58] Field of Search ...................... 205/344, 508, 205/509, 538, 539, 544, 545, 57, 60, 351

[56] References Cited

U.S. PATENT DOCUMENTS

| | | | |
|---|---|---|---|
| 4,067,788 | 1/1978 | Solomon | 205/349 |
| 5,135,622 | 8/1992 | Abys et al. | 204/96 |
| 5,282,935 | 2/1994 | Cawlfield | 205/511 |
| 5,384,017 | 1/1995 | Lumbroso | 205/49 |
| 5,391,265 | 2/1995 | Krynitz | 205/509 |

FOREIGN PATENT DOCUMENTS

| | | |
|---|---|---|
| 0462889 | 12/1991 | European Pat. Off. . |
| 0559590 | 9/1993 | European Pat. Off. . |
| 3508360 | 3/1985 | Germany . |
| 63-206487 | 8/1988 | Japan . |
| 4171027 | 6/1992 | Japan . |
| 1600750 | 10/1981 | United Kingdom . |
| WO9006167 | 6/1990 | WIPO . |

*Primary Examiner*—John Niebling
*Assistant Examiner*—Brendan Mee
*Attorney, Agent, or Firm*—Weingarten, Schurgin, Gagnebin & Hayes LLP

[57] ABSTRACT

The invention concerns an electrochemical process for the production of metallic hydroxides and/or metallic-oxide hydroxides from metal ions and hydroxide ions, as well as a device for carrying out the process. The metallic hydroxide and/or metallic-oxide hydroxide is formed in a chamber K, bordered on the cathode side by a bipolar membrane, and the required hydroxide ions arise by means of a bipolar membrane, the anion-selective layer being arranged on the anode side. The metal ions are either fed into the chamber K or formed in the chamber K in the presence of an agent, present in the chamber K and at a pH>7, which complexes the metal ions. The device for implementation of the process exhibits a cylindrical head geometry, connected to a conical geometry.

16 Claims, 3 Drawing Sheets

Membrane configuration of Variant 1:

Membrane configuration of Variant 2:

ELECTROCHEMICAL PROCESS AND DEVICE FOR THE PRODUCTION OF METALLIC HYDROXIDES AND/OR METALLIC-OXIDE HYDROXIDES

FIELD OF THE INVENTION

The invention concerns an electrochemical process for the production of metallic hydroxides and/or metallic-oxide hydroxides from metal ions and hydroxide ions, as well as a device for implementation of the process.

BACKGROUND OF THE INVENTION

Metallic hydroxides and metallic-oxide hydroxides find the broadest application in the most diverse industrial fields, for example, as intermediate products of the production of metals themselves or of the corresponding metallic oxides, which are then in turn processed further, for example, into ceramics, etc.

Zinc hydroxides, for example, can be applied as preliminary stages for pigments, photoconductors (for example, in electrophotography), catalyst components (for example, in methanol synthesis), fluorescent substances, absorptive agents (for example, for the removal of $H_2S$ from gases), etc. Zinc-oxide hydrates are suitable, for example, as a catalyst component for the oxidation of aromatics, iron(III) hydroxide is employed, for example, in water purification, for pharmaceutical purposes or for the manufacture of iron colorants, and cobalt(II) hydroxide can, for example, serve as a starting material for the production of siccatives. Many applications of the metallic hydroxides and metallic-oxide hydroxides concern especially their particulate form, the particle size of the same and their particle-size distribution.

Thus, in the chemical industry for example, Ni(II) hydroxide is utilized as a base chemical in the ceramic-products sector and especially in the construction of batteries. In addition to use as the positive electrode in commercial secondary cells, such as nickel-cadmium and nickel-iron battery systems, nickel hydroxide is being applied to an increasing degree in environmentally friendly nickel-metallic hydroxide batteries which contain no heavy metals. The active components of the batteries are the anode, consisting of a hydratable metal alloy which is free of heavy metals, and the cathode which consists of nickel hydroxide. The mass electrodes are installed in a gastight steel housing and separated by a plastic fleece. Determined by the mechanical structure of the battery, various requirements are imposed upon the product nickel hydroxide relative to morphology and appearance. The most uniform product possible with a spherical morphology and narrow particle-size distribution should be obtained to achieve good flowing behavior during the filling of the porous nickel-foam electrodes.

STATE OF THE TECHNOLOGY

Various methods involving precipitation out of metallic-salt solutions in an alkaline medium are described for the production of metallic hydroxides and metallic-oxide hydroxides. Nickel chloride, for example, is the most common starting material for the precipitation of nickel hydroxide. Precipitation from nickel sulfate, nickel carbonate and nickel nitrate solutions is likewise known. Employed as precipitating agents are alkali hydroxides, alkaline-earth hydroxides, alkali carbonates and aqueous ammoniac solutions.

The production of nickel hydroxide from a nickel(II)-chloride solution combined with caustic soda at an elevated temperature (T=70°–80° C.) corresponds to the following gross equation:

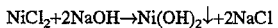

Nickel(II) hydroxide thereby precipitates as a voluminous, gel-like, green precipitate, which is then dehydrated during standing to form an amorphous product. The hydroxide precipitated in this way is also in a colloidal form after drying and, with regard to its physical-chemical and morphological properties, does not correspond to the desired characteristics for use in batteries.

In very general terms, the precipitation of metallic hydroxides from metallic chlorides with caustic soda solution corresponds to the following gross equation:

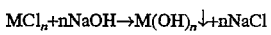

A focused influencing of the physical-chemical and morphological properties of nickel hydroxide can result by the addition of ammoniac during product formation. The ammoniac serves as a complexing agent and prevents a spontaneous precipitation of the hydroxide. Ammoniac increases the solubility of the nickel hydroxide and thus reduces a relative supersaturation at certain educt concentrations. This process for the production of nickel hydroxide is carried out in a reactor (vessel with stirrer or loop reactor) by the introduction of ammoniac in excess (6-fold excess) into an alkaline nickel chloride solution. The pure product, after filtration, drying and a multiple-stage washing process, is obtained with further filtration and drying. Such products do not however meet the cited requirements with regard to particulate form, particle-size distribution and flowing capability of the material.

Necessarily occurring in the case of chemical precipitation-crystallization processes for the preparation of metallic hydroxides are, for example, n moles of NaCl per mole of metallic hydroxide, if the precipitation takes place from a metallic chloride solution by the use of caustic soda solution. In view of stricter environmental guidelines and lower tolerance limits for waste waters, on the one hand, and economic aspects, determined by a high lye consumption and resulting costs for the disposal of the salt occurring, on the other, closed-circuit production systems are desirable.

For example, in the case of a process operated in this way, nickel is anodically dissolved in a metallic-salt solution and precipitated by cathodically formed hydroxide ions as nickel hydroxide. After a sedimentation and various subsequent washing steps, the precipitated product is purified of salts, still present or included during the precipitation.

Disclosed in JP-63/247,385 is the electrolytic production of metallic hydroxides by the use of perfluorinated anion-exchanger membranes and application of inert electrodes. Employed thereby as an electrolyte on the anode side is a salt of that metal, whose hydroxide is to be produced, an aqueous, alkaline solution being used in the cathode circuit.

A comparable arrangement is described in EP 0,559,590 A1. In that case, the metal ions are generated continuously by anodic dissolution of an electrode. The requirements of the process and the procedural parameters, especially the membranes and electrolyte solutions to be used, are not however adequately disclosed.

The described processes do not however yield hydroxide particles meeting the cited requirements with regard to the particle form, the particle size, the particle-size distribution and the flowing capability.

The task of the present invention is therefore to make a process available with which metallic hydroxides and/or metallic-oxide hydroxides can be produced, which are compact, exhibit high packing densities, a high flowing capacity and spherical particle shapes, as well as a narrow particle-size distribution and constant quality. The process should moreover be inexpensive, universally applicable and independent of the desired metallic hydroxide and/or metallic-oxide hydroxide. Furthermore, it should be possible to operate the process continuously, and no by-products should occur, which need to be disposed of.

SUMMARY OF THE INVENTION

This objective is achieved with an electrochemical process for the production of metallic hydroxides and/or metallic-oxide hydroxides, in which the metal ions are precipitated by hydroxide ions, characterized by the fact that the metallic hydroxide and/or metallic-oxide hydroxide is formed in a chamber K, bordered on the cathode side by a bipolar membrane, that the required hydroxide ions are generated with a bipolar membrane whose anion-selective layer is arranged on the anode side, and that the metal ions are fed into the chamber K, or formed in the chamber K, in the presence of an agent, present in the chamber K and with a pH>7, which complexes the metal ions.

The invented process exhibits the great advantage over the state of the technology that metallic hydroxide and/or metallic-oxide hydroxide particles arise with the properties desired (particle shape, particle size, particle-size distribution, flowing capability), and that the required hydroxide ions are introduced by water-dissociation with the aid of bipolar membranes. That considerably reduces the salt burden and the production of by-products. The invented process represents a continuous process for the production of amorphous or spherical metallic hydroxides and/or metallic-oxide hydroxides from metallic-complex solutions by means of membrane electrolysis. In the case of the invented process, metal ions are combined with a complexing agent, and the metallic hydroxide and/or metallic-oxide hydroxide is precipitated out of the forming complex compound by the addition of hydroxide ions.

DETAILED DESCRIPTION OF THE INVENTION

There are two process variants relative to the feeding of metal ions into the chamber K.
Variant 1:
In the case of the first variant, the metal ions are generated directly within the chamber K by the anodic dissolution of a sacrificial anode. For that purpose, the chamber K is delimited on the anode side with a sacrificial anode, the chamber K thus forming an anode chamber. The latter is subdivided by the bipolar membrane from the cathode chamber, so that two separate circulations result. Moreover, the chamber K contains the complexing agent and exhibits a pH greater than 7. If a potential difference is now applied, metal ions pass into solution at the anode, yielding electrons, and immediately form complex compounds with the complexing agent. That prevents a spontaneous precipitation of the metallic hydroxides and/or metallic-oxide hydroxides. Under the influence of the electric field and furthermore with the help of the bipolar membrane, hydroxide ions are generated, which migrate through the anion-selective layer of the bipolar membrane into the chamber K. These precipitate as soon as the solubility product of the metallic hydroxides and/or metallic-oxide hydroxides is exceeded. The precipitation thereby follows a dynamic equilibrium, a ligand exchange taking place (complexing agent for hydroxide).

Figure 1:
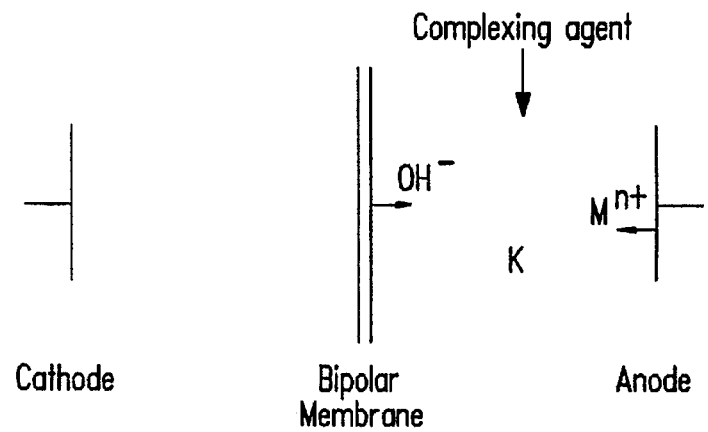
FIG. 1 shows a membrane configuration for process variant 1.

FIG. 1 shows a membrane configuration for process variant 1, where the smallest unit consists of cathode, bipolar membrane and anode and the anion-selective layer of the bipolar membrane is arranged on the anode side. It is also possible to arrange several cells in a series in the form of a stack, the arrangement of the cells of neighboring chambers being inverted, so that neighboring cells respectively share an electrode in common and result in the following configuration. In that case, BMP stands for a bipolar membrane whose anion-selective layer is respectively arranged on the anode side. The unit with the index n can be repeated, n assuming values between 0 and 100.

Cathode–BPM–(Anode–BPM–Cathode–BPM–)$_n$Anode

Alkaline solutions can be used as a catholyte, for example, caustic soda or potash solution. It is thereby an economic advantage for the process, if the solution itself has high conductivity, and the cation of the lye employed is likewise utilized on the anode side. The cathode itself can consist, for example, of refined steel, platinized titanium, nickel or a nickel alloy.

The composition of the anolyte in process variant 1, i.e. the content of the chamber K, results from the educts for the production of the metallic hydroxides and/or metallic-oxide hydroxides. These are the complexing agent as well as a salt for the increase of conductivity (for example, NaCl). To improve the anodic dissolution of the metals, small quantities of sulfate ions can be added, advantageously in the form of sulfate of that metal whose hydroxide and/or oxide hydroxide is to be produced.

The formation of the spherical product is thereby determined essentially by the conditions of precipitation, i.e. by the concentration of the individual components and by the course of the temperature in the anode circulation. The precipitated can then be separated continuously from the anolyte circulation. This separation is from the standpoint of process technology easy to carry out and can take place in a sedimentation container on the basis of the great difference between the density of the product formed and that of the solvent. The separation can take place via a filtration stage (microfiltration) for the separation of a product with uniform particle size. The essential advantage of this process variant is the elimination of additional, individual process steps for the recovery of the various educts, because they are retained in the anolyte circulation.

Process variant 1 is applicable to those metals which can be dissolved anodically and complexed in an alkaline medium. Without limitation of the generality, these include, for example, Co, Ni, Cu, Fe, In, Mn, Sn, Zn, Zr, Ti, Al, Cd and U, Co and Ni being very particularly preferred.
Variant 2
In the case of the second variant, metal ions are fed to a chamber $K_1$, bordering the chamber K on the anode side and separated from it by a cathode-exchange membrane, either in the form of metallic salts or by the dissolution of metals in an acid medium. The chamber K contains the complexing agent and exhibits a pH greater than 7. If a potential difference is then applied, metallic cations migrate through the cation-exchange membrane, from the chamber $K_1$ into the chamber K, under the influence of the electric field. They there form first of all metallic-complex compounds together with the complexing agent. Moreover, hydroxide ions are formed under the influence of the electrical field, with the aid of the bipolar membrane, which likewise migrate into the chamber K through the anion-selective layer of the bipolar membrane. The metallic hydroxide precipitates as soon as its solubility product is exceeded.

Figure 2:
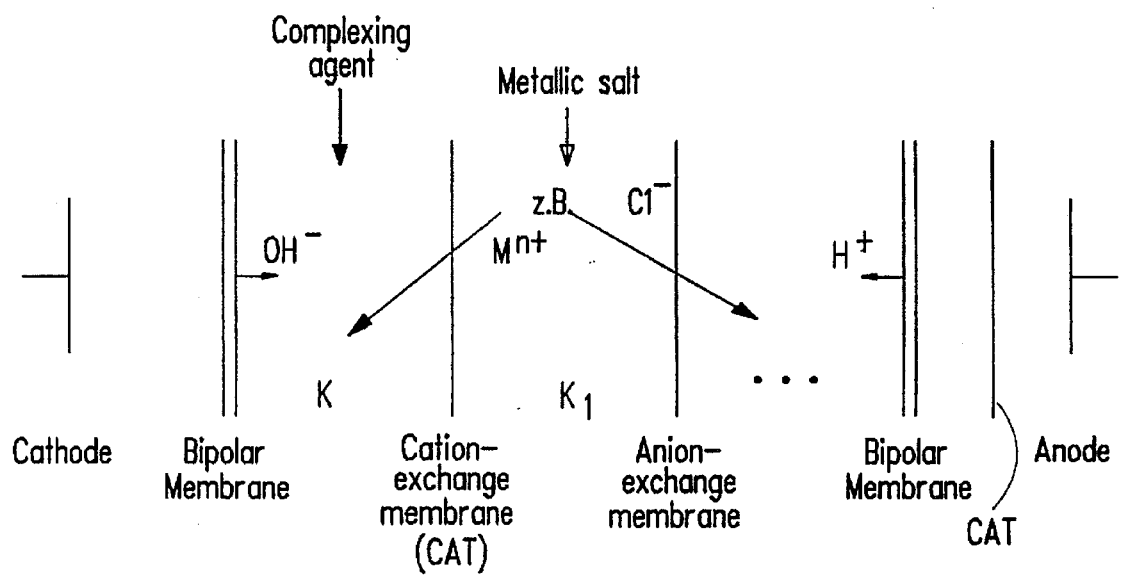
FIG. 2 shows a membrane configuration for process variant 2.

FIG. 2 shows a membrane configuration for process variant 2. This variant represents as an electrodialysis with bipolar membranes in the three-chamber process. BPM means bipolar membrane, AAT anion-exchange membrane and CAT cation-exchange membrane. The unit with the index n can be repeated, in which case n assumes values between 1 and 50.

CATHODE–(BPM–CAT–AAT–)$_n$BPM–CAT–ANODE

A cation-exchange membrane is preferably installed directly in front of the anode, creating an additional chamber in front of the anode. This serves most importantly to prevent the anion-selective layer of the bipolar membrane from being destroyed by anodically formed oxygen.

The salt solution is fed through the middle chamber (diluate) of the repeating unit. The metal ions are converted into the basic concentrate, via the cation-exchange membrane, under the driving force of the potential applied to the electrodes. The mineral acid necessary for the dissolution of the metal is recovered in the acid concentrate of the repeating unit.

Alkaline solutions, for example, caustic soda or caustic potash, can again be employed as the a catholyte. Here, too, it is economically advantageous for the process, if the solution itself possesses high conductivity, and the cation of the lye employed on the anode side is likewise employed on the anode side. The cathode itself can consist, for example, of refined steel, platinized titanium, nickel or a nickel alloy.

The content of the chamber K results again from the educts for the production of metallic hydroxides and/or metallic-oxide hydroxides. These are the complexing agents as well as a salt for increasing conductivity (for example, NaCl). Small quantities of sulfate ions can be added, preferably in the form of a sulfate of that metal whose hydroxide and/or oxide hydroxide is to be produced.

The formation of the spherical product is thereby again determined essentially by the conditions of precipitation, i.e. by the concentration of the individual components and by the course of the temperature in the circulation of the chamber K. The precipitated product can then be separated continuously from this circulation. The separation is from the standpoint of process technology easy to carry out and can take place in a sedimentation container on the basis of the great difference between the density of the product formed and that of the solvent. For the separation of a product with uniform particle size, the separation can take place via a filtration stage (microfiltration). The essential advantage of this process variant is the elimination of additional, individual process steps for the recovery of the various educts, because they are retained in the circulation of the chamber K.

Process variant 2 is usable for all those metals complexable in an alkaline medium. Without limitation of the generality, these include, for example, Co, Ni, Cu, Fe, In, Mn, Sn, Zn, Zr, Ti, Al, Cd and U, Co and Ni being very especially preferred.

Ordinarily, depleted nickel sacrificial anodes are inserted as cathodes in electrolysis or membrane electrolysis. It is necessary to dispose of the electrodes if their mechanical stability is no longer adequate. Improvement of the economic viability of the overall process is now possible through the combination of process variants 1 and 2. In that case, the metal ions are first generated per variant 1 by the anodic dissolution of a sacrificial anode. When this is depleted, the electrode is dissolved by means of a neutral acid, resulting in a metallic salt solution which is processed further with the aid of variant 2 of the invented process. Considered from an economic point of view, the result is a complete utilization of the metal employed for the preparation of the corresponding hydroxides and/or oxide hydroxides.

Furthermore, process variant 2 can also be chosen, if the expenses for highly purified metal sacrificial anodes are too high. The metal can then also be employed in a different form, i.e. less pure form, as raw material.

Figure 4:
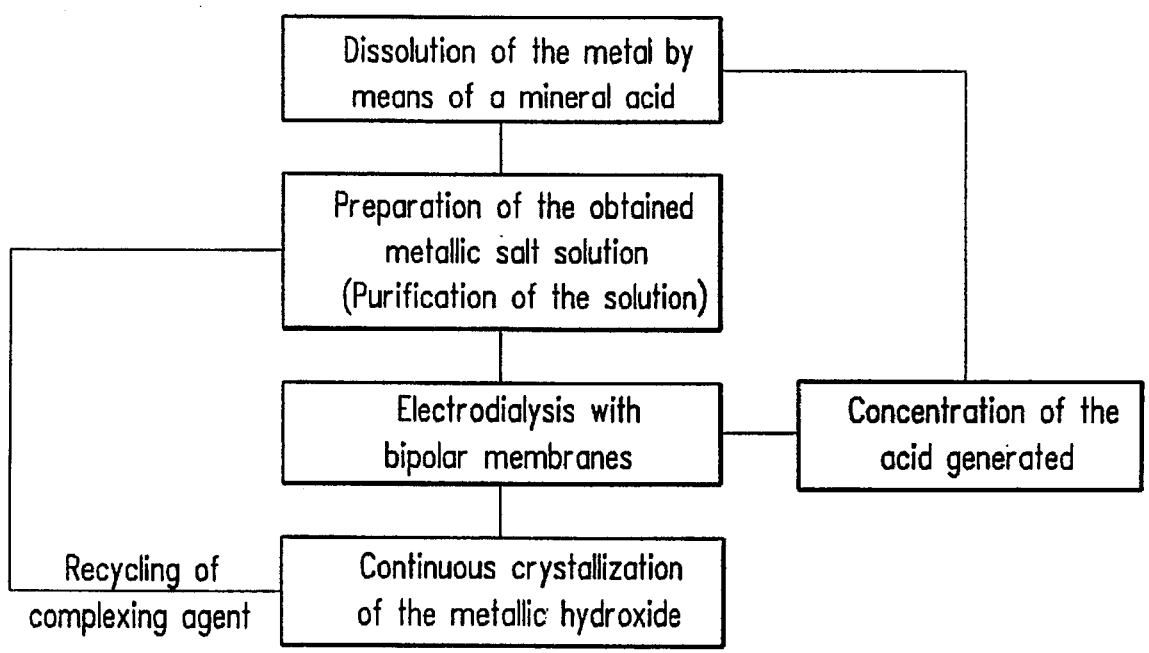
FIG. 4 is a flow chart of the electrolysis with bipolar membranes for the recovery of metallic hydroxides per process variant 2.

FIG. 4 is a flow chart of the electrolysis with bipolar membranes for the recovery of metallic hydroxides per process variant 2:

The type of complexing agent used will depend upon the type of metal to be complexed. The specialist is in a position, on the basis of his knowledge, to select suitable complexing agents for the respective metal ions. It is moreover possible to employ mixtures of complexing agents. Preferred complexing agents are ammoniac or amines having general formula 1:

(1)

in which the radicals have the following meaning:
R'=hydrogen, alkyl or aryl with as the case may be from 1 to 6 carbon atoms;
R"=alkyl or aryl with as the case may be from 1 to 6 carbon atoms.

Without limitation of generality, amines suitable for implementing the invented process are butylmethylamine, butylethylamine, butylpropylamine, dibutylamine, diethylamine, dimethylamine, dipropylamine, ethylmethylamine, ethylpropylamine, methylpropylamine, methylamine, ethylamine, propylamine and butylamine.

Preferred bipolar membranes for carrying out the invented process are those with an anion-selective layer based upon polymeric alkylating agents and monomeric amines, or polymeric amines and monomeric alkylating agents, or polymeric alkylating agents and polymeric amines. Preferred furthermore are bipolar membranes with an anion-selective layer based upon polymers carrying one or more —CHCl$_2$ groups or based upon mixture of polymers carrying —CHCl$_2$ groups and those without —CHCl$_2$ groups. These polymers, with or without CHCl$_2$ groups, are preferred: polysulfones, polyether sulfones, poly(p-phenylene sulfones), polystyrenes, polyphenylene oxides, poly(2,6-dimethylphenyl ether), polyphenylene sulfides, polyether ketones (PEK), polyether ether ketones (PEEK) or polyether etherketone ketones (PEEKK). Such bipolar membranes are described in the greatest detail in DE 4,211,267 A1 as well as in DE 4,026,154 A1. Reference is made expressly to the information in these documents.

Furthermore, bipolar membranes with an anion-selective layer based upon DABCO (1,4-diazobicyclo-[2,2,2]octane), 1,3-bis(dimethylamino-2,2-dimethylpropane) or a different amine are preferred, which are capable of forming alkali-stable quaternary ammonium ions and in which monoquaternization is favored over bisquaternization by a differing nucleophilia of at least $\Delta pK_a > 1.0$. Such membranes are described most thoroughly likewise in DE 4,211,267 A1 as well as DE 4,026,154 A1 and are characterized by

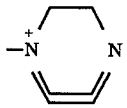

groups and/or by

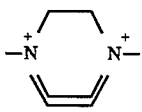

groups and/or by

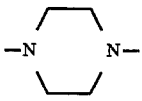

bridges in the anion-selective layer. Such bipolar membranes are extremely alkali-stable and therefore particularly well suited for application in the invented process.

Process variant 1 is explained in detail below in terms of the example of the production of nickel hydroxide.

| Electrolyte composition | |
| --- | --- |
| Anolyte | 16.5 mmol/l of NiSO$_4$ |
| | 220 ml NH$_3$ (25%) |
| | 2 mol/l NaCl |
| Catholyte | 1 mol/l NaOH |
| Process conditions | |
| Anode | electrochemically produced, highly pure nickel electrode |
| Cathode | platinized titanium |
| T | 323 K |
| Current density i | 107 mA/cm$^2$ |
| Voltage drop U | 2.75 V |
| Chamber height | each 2 mm |
| Overflow rate | >10 cm/sec |
| pH in anolyte | 10.5–11.5 |

Under galvanostatic conditions, an intensely blue hexamine complex first arises. A particulate, green nickel hydroxide is formed from it with increasing anodic dissolution, which precipitates when the solubility limit is exceeded.

Figure 3:
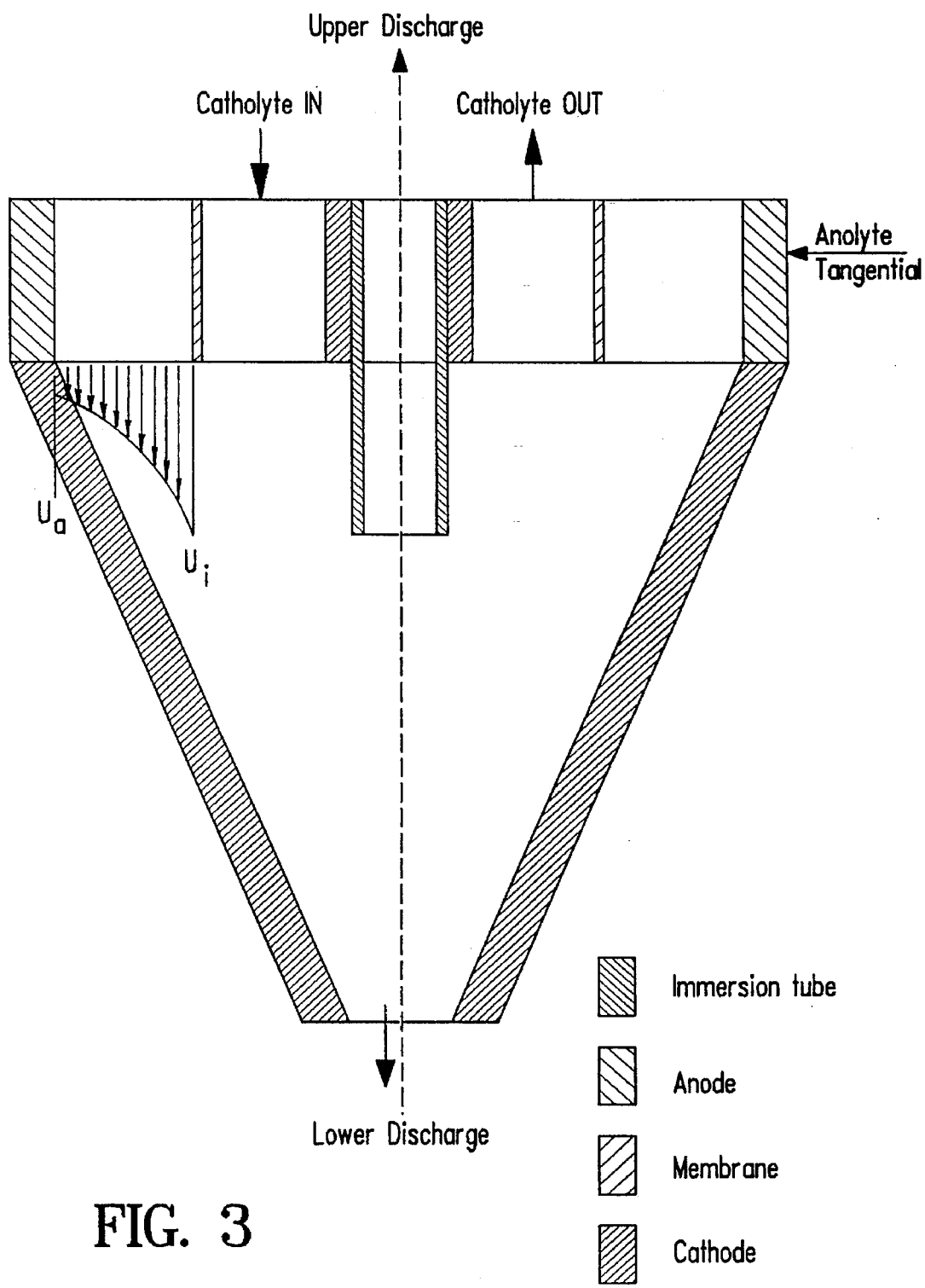
FIG. 3 is a cross-sectional view of a device for carrying out the method of the invention described in FIG. 1.

Shown in FIG. 3 is a suitable device for carrying out the invented process per variant 1. A continuous operation of the process with integrated product formation and separation of the same is possible with this unit. The device consists essentially of a cylindrical head geometry, in which the inner electrode is installed around an immersion tube. This is preferably the cathode. Stainless steel, nickel or a platinized metal can be used as the cathode material. In the middle of the inner electrode is an outlet for the immersion tube. The outer enclosure, i.e. the outer cylinder is the second electrode. This is preferably the sacrificial anode. Positioned between the two electrodes, in the cylindrical part, is the bipolar membrane with the anion-selective layer arranged on the anode side, resulting in two separate chambers for fluid.

The inner electrode chamber exhibits two bores on its surface, through which the entry and exit of the electrolyte, preferably the anolyte, takes place. The cylindrical part of the cathode chamber can be furthermore equipped with baffles for the purpose of good circulation through the chamber and for the discharge of gases formed at the cathode. The feeding of the fluid solution into the outer electrode chamber, preferably the anode chamber, takes place tangentially to the cylinder geometry. This chamber can likewise be additionally equipped with guiding or revolving blades. Connected to the cylindrical part is a conical part, so that two possibilities arise for the discharge of the liquid, namely, a drain at the bottom and an overflow drain. The method of operation of this invented device in the anode chamber, relative to the classification of suspended particles, is comparable to that of a hydrocyclone, likewise the hydrodynamic relationships. The separation of the particles with the use of a hydrocyclone takes place in the centrifugal field, i.e. the radius of the cylindrical head determines the size of the separated particles as a function of their density.

The following process control then results for the recovery of the metallic hydroxide and/or metallic-oxide hydroxide, the inner electrode being the cathode, the outer one the anode:

An electric field is applied to the two electrodes. The formation of the metallic complex with the described anodic dissolution and reaction of the various substances takes place in the cylindrical portion of the device. The separation of the formed product takes place in the conical portion of the device, which has geometrical dimensions established according to the product quality, i.e. corresponding to the size of the metallic hydroxide particles. The bulk of the solution, with particles which are too small, is kept in circulation through the upper outlet and recycled, while a small partial current with the corresponding particle size is withdrawn through the lower outlet. A clogging of the anode chamber or formation of a covering layer upon the membrane is largely prevented by the rate of peripheral flow at the membrane surface, which is relatively high in comparison with that of the conventional geometry mentioned above. The dissolution of the sacrificial anode takes place very uniformly via the defined form of flow and due to the comparatively high tangential speed.

With the invented device it is possible to carry out all those hydroxide and or oxide hydroxide precipitations whose density difference between solvent (mostly water) and the hydroxide and/or oxide-hydroxide is sufficiently large.

The operation of the invented device is likewise possible with interchanged electrodes, i.e. cathode outside and anode inside. In that case, the arrangement of the electrodes will depend upon the given application.

What is claimed is:

1. Electrochemical process for the production of metallic hydroxides and/or metallic-oxide hydroxides from metal ions and hydroxide ions, comprising:
   providing an anode and a cathode separated by a bipolar membrane to form a chamber (K) between the bipolar membrane and the anode, the bipolar membrane having an anion-selective layer arranged to face the anode;
   providing metal ions and a complexing agent in the chamber at a pH greater than 7 to form complex compounds; and
   forming the metallic hydroxide and/or metallic-oxide hydroxide in the chamber by provision of hydroxide ions from the bipolar membrane.

2. Process according to claim 1, characterized by providing the metal ions by dissolution of the anode in the chamber (K).

3. Process according to claim 2, characterized by providing a cation-exchange membrane between the bipolar membrane and the anode to define a further chamber (K1) between the cation-exchange membrane and the anode, providing an acid in the further chamber so that the anode is dissolved in the presence of an acid, and passing the metal ions through the cathode-exchange membrane to the chamber (K).

4. Process according to claim 1, characterized by feeding the metal ions into the chamber (K) through a cation-exchange membrane installed between the bipolar membrane and the anode.

5. Process according to claim 4, characterized by providing the metal ions by the dissolution of metallic salts or by the dissolution of metals.

6. Process according to claim 1, characterized by providing chloride and/or sulfate ions, so that the metallic hydroxide and/or metallic-oxide hydroxide is formed in the presence of the chloride and/or sulfate ions.

7. Process according to claim 1, characterized by removing parts of the contents of the chamber (K) containing the complexing agent and the metallic hydroxide and/or metallic-oxide hydroxide, separating the metallic hydroxide and/or metallic oxide hydroxide therefrom, and recycling the residue containing the complexing agent back into the chamber (K).

8. Process according to claim 1, characterized by employing ammoniac and/or one or more amines with general formula 1 as the complexing agent:

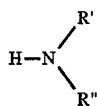
(1)

in which the radicals have the following meaning:
R'=hydrogen, alkyl or aryl with as the case may be from 1 to 6 carbon atoms;
R"=alkyl or aryl with as the case may be from 1 through 6 carbon atoms.

9. Process according to claim 1, characterized by using a metal comprising Co, Ni, Cu, Fe, In, Mn, Sn, Zn, Ti, Al, Cd or U.

10. Process according to claim 9, wherein the metal comprises Ni and/or Co.

11. Process according to claim 1, characterized by using a bipolar membrane with an anion-selective layer based upon polymeric alkylating agents and monomeric amines, or polymeric amines and monomeric alkylating agents, or polymeric alkylating agents and polymeric amines.

12. Process according to claim 11, characterized by using a bipolar membrane with an anion-selective layer based upon polymers containing one or more polymers carrying —$CHCl_2$ groups or on the basis of a polymer containing a mixture of a polymers carrying —$CHCl_2$ groups and those without —$CHCl_2$ groups.

13. Process according to claim 12, characterized by using a bipolar membrane which is based upon polysulfones, polyether sulfones, poly(p-phenylene sulfones), polystyrenes, polyphenylene oxides, poly(2,6-dimethylphenyl ethers), polyphenylene sulfides, polyether ketones (PEK), polyether ether ketones (PEEK) or polyether etherketone ketones (PEEKK).

14. Process according to claim 11, characterized by using a bipolar membrane based upon DABCO (1,4-diazobicyclo-[2,2,2]-octane), 1,3-bis(dimethylamino-2,2-dimethylpropane) or another diamine, which is alkali-stable, capable of forming quaternary ammonium ions and favors monoquaternization over bisquaternization by a nucleophilic difference of a least $\Delta pK_a > 1.0$.

15. Process according to claim 14, characterized by using a bipolar membrane with

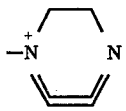

groups in the anion-selective membrane.

16. Process according to claim 14, characterized by using a bipolar membrane with

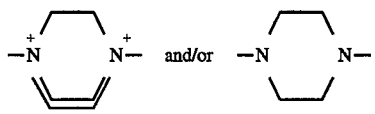

bridges in the anion-selective layer.

* * * * *